United States Patent
Pichhadze

(10) Patent No.: US 11,144,860 B2
(45) Date of Patent: Oct. 12, 2021

(54) METHOD AND SYSTEM FOR GENERATING A DASHBOARD

(71) Applicant: KNOWLEDGE OBSERVER INC., Richmond Hill (CA)

(72) Inventor: Aviv Pichhadze, Montreal (CA)

(73) Assignee: KNOWLEDGE OBSERVER INC., Ontario (CA)

( * ) Notice: Subject to any disclaimer, the term of this patent is extended or adjusted under 35 U.S.C. 154(b) by 172 days.

(21) Appl. No.: 16/008,626

(22) Filed: Jun. 14, 2018

(65) Prior Publication Data
US 2019/0385109 A1 Dec. 19, 2019

(51) Int. Cl.
| | |
|---|---|
| *G06F 3/048* | (2013.01) |
| *G06Q 10/06* | (2012.01) |
| *G06F 3/0481* | (2013.01) |
| *G06F 16/904* | (2019.01) |

(52) U.S. Cl.
CPC ... *G06Q 10/06393* (2013.01); *G06F 3/04817* (2013.01); *G06F 16/904* (2019.01)

(58) Field of Classification Search
CPC ...... G06F 3/0482; G06F 3/0484; G06F 17/18; G06F 16/43; G06F 16/438; G06F 3/04817; G06F 9/451; G06F 16/338; G06F 17/212; G06F 19/00; G06F 3/011; G06F 16/358; G06F 16/50; G06F 16/583; G06F 16/5838; G06F 16/904; G06F 16/958; G06F 3/0481; G06F 3/04812; H04L 67/306; H04L 67/02
See application file for complete search history.

(56) References Cited

U.S. PATENT DOCUMENTS

| | | | |
|---|---|---|---|
| 8,959,149 B1 * | 2/2015 | Skiens | G06Q 50/01 709/204 |
| 9,537,964 B2 * | 1/2017 | Glommen | H04L 67/22 |
| 9,704,118 B2 * | 7/2017 | Tanna | G05B 23/0229 |
| 9,841,880 B1 * | 12/2017 | Beaty | G06F 3/0484 |
| 10,033,536 B2 * | 7/2018 | Mercury | H04L 9/3247 |
| 2004/0133876 A1 * | 7/2004 | Sproule | G06Q 10/063 717/105 |
| 2005/0288956 A1 * | 12/2005 | Speicher | G06Q 10/06 705/80 |

(Continued)

*Primary Examiner* — William C Trapanese
(74) *Attorney, Agent, or Firm* — Pearl Cohen Zedek Latzer Baratz LLP

(57) ABSTRACT

A system for generating a dashboard comprising: a database comprising: an activity type table comprising pre-configured activity types; a user activity table comprising at least one activity each being associated with a respective pre-configured activity type; a badge table comprising at least one badge each associated with an activity; a library comprising a dashboard template and at least one graphical element each associated with a respective badge, each dashboard template comprising a plurality of predefined location at which a respective graphical element is insertable and being associated with a respective pre-configured activity type; and a processor configured for each badge associated, retrieving a corresponding graphical element from the library and inserting the retrieved graphical element at the predefined location associated with the pre-configured activity type associated with the badge to obtain a completed dashboard, and outputting the completed dashboard.

18 Claims, 7 Drawing Sheets

(56) References Cited

U.S. PATENT DOCUMENTS

| | | | | |
|---|---|---|---|---|
| 2006/0031840 A1* | 2/2006 | Yigit | G06F 9/5088 | 718/102 |
| 2008/0195964 A1* | 8/2008 | Randell | G06Q 10/06 | 715/772 |
| 2009/0119062 A1* | 5/2009 | Owens | G06Q 10/10 | 702/176 |
| 2011/0288962 A1* | 11/2011 | Rankin, Jr. | G06Q 30/02 | 705/27.1 |
| 2011/0289009 A1* | 11/2011 | Rankin, Jr. | G06Q 10/10 | 705/313 |
| 2011/0289010 A1* | 11/2011 | Rankin, Jr. | G06Q 10/10 | 705/313 |
| 2012/0115585 A1* | 5/2012 | Goldman | G07F 17/3274 | 463/25 |
| 2012/0253918 A1 | 10/2012 | Marois et al. | | |
| 2012/0311623 A1* | 12/2012 | Davis | H04N 5/765 | 725/18 |
| 2012/0323938 A1* | 12/2012 | Skeen | H04L 65/4069 | 707/754 |
| 2013/0040654 A1* | 2/2013 | Parish | H04L 63/0807 | 455/456.1 |
| 2013/0086484 A1* | 4/2013 | Antin | G06Q 10/10 | 715/751 |
| 2013/0283194 A1* | 10/2013 | Kopp | G06F 16/358 | 715/764 |
| 2014/0006930 A1* | 1/2014 | Hollis | G06F 17/2247 | 715/234 |
| 2014/0039842 A1* | 2/2014 | Yuen | A61B 5/6838 | 702/189 |
| 2014/0146648 A1* | 5/2014 | Alber | G11B 27/002 | 369/53.1 |
| 2014/0146650 A1* | 5/2014 | Alber | G11B 27/002 | 369/53.41 |
| 2014/0149477 A1* | 5/2014 | Abramovitz | G11B 27/002 | 707/827 |
| 2014/0180711 A1* | 6/2014 | Kamen | G06Q 10/06 | 705/2 |
| 2014/0353369 A1* | 12/2014 | Malin | G06Q 30/018 | 235/375 |
| 2015/0112776 A1* | 4/2015 | Murphy | G06Q 30/0211 | 705/14.13 |
| 2016/0071424 A1* | 3/2016 | Harney | G09B 5/06 | 434/350 |
| 2016/0179900 A1* | 6/2016 | Stefik | G06Q 10/0637 | |
| 2017/0098182 A1* | 4/2017 | La Reau | G06Q 10/06395 | |
| 2017/0123397 A1* | 5/2017 | Billi | G05B 15/02 | |
| 2017/0193420 A1* | 7/2017 | Tiwari | G06Q 10/06398 | |
| 2017/0230694 A1* | 8/2017 | Shaw | H04N 21/251 | |
| 2017/0330195 A1* | 11/2017 | Lange | G06F 3/0486 | |
| 2018/0219806 A1* | 8/2018 | Girishankar | H04L 51/02 | |
| 2018/0246486 A1* | 8/2018 | Krasadakis | G06Q 10/06 | |
| 2018/0246983 A1* | 8/2018 | Rathod | H04L 63/102 | |

* cited by examiner

METHOD AND SYSTEM FOR GENERATING A DASHBOARD

TECHNICAL FIELD

The present invention relates to the field of information display, and more particularly to methods and system for generating dashboards.

BACKGROUND

Researchers, scientists, and scholars (collectively "researcher" or "researchers") are expected, among other things, to (i) develop an online presence, (ii) act as ambassadors for their respective institutions, (iii) maintain relations with colleagues and meet new potential collaborators, (iv) be involved in research, and (v) engage with potential funders. Central to the achievement of these tasks, which involve, among other things, the showcasing and evaluation of the researcher's performance, is the establishment of trustworthiness by tying the researcher's identity to certain key performance indicators (KPIs) representing the researcher's success in reaching a particular activity or goal. The applicants have identified two challenges associated with the establishment of researchers' trustworthiness: (i) the assembly and creation of accurate and credible researcher data, and (ii) the presentation of such data in a meaningful and actionable manner.

With recent advances in electronic records and the widespread adoption of electronically-recorded data relating to researchers, there exist vast repositories of information relating to individual researchers. However, these data often rest with many different entities. For example, academic institutions, research centers, institutional publication repositories, funding agencies, and social media sites catering to researchers, among others, may record, store, or otherwise manage some data related to researchers' publications, performance, professional activities, and/or ability to secure funding for their research. Although all data stored with various source entities may be related to the same individual researcher, divergence of objectives and motivations between the different source entities may result in little continuity between the datasets.

In addition, third-party providers of data to the different source entities may contribute to the challenges of managing and presenting researcher-related information. For example, information about a researcher's published manuscript obtained from a source entity (Source Entity A) may, in turn, be provided to that source entity by the publishers of the relevant manuscript (Source Entity B), which themselves act as a source provider to Source Entity A. Such information, however, may contain errors due to the manner the information was inputted and uploaded by Source Entity B to Source Entity A's databases, distorting the accuracy of the manuscript's records and, consequently, researcher-related data available from Source Entity A.

Relatedly, researchers themselves may also contribute to the challenges of managing information about their performance and activities available via electronically-recorded data. Researchers may record their data with different sourcing entities, leading to multiplicity of records that may be incomplete or even conflicting due, in part, to each sourcing entity's data collection objectives.

Presentation of researcher-related data is another issue affecting the evaluation of researchers' performance. The proliferation of researchers' profiles on social and professional media allows researchers and other interested parties placing increasing reliance on such online profiles to access and assess researchers' profiles and information via the internet. These online profiles range from the generic (representing an electronic version of the researcher's CV) to more nuanced versions offering researcher profiles with dashboards (that is, the visual presentations of information in the form of, for example, graphs or charts). The information offered by many such dashboards follows the practices of university ranking methodologies offered by leading university ranking providers such as the Shanghai University Ranking and the Times Higher Education Rankings, in placing emphasis on a limited number of KPIs, such as researchers' publications, article download statistics, and article citation statistics. The usefulness of such nuanced dashboards, however, is limited. At best, they point to a researcher's performance based on a narrow number of metrics that do not reflect the researcher's contribution to their relevant field of study. At worst, they undermine the role researchers play in society and their contributions thereto, thereby placing a negative pressure on researchers.

With economies becoming more knowledge-based, where human capital is the largest and most basic determinant of a country's economic success, capturing and presenting researcher-related information is becoming a significant resource for (i) researchers operating in the highly competitive domestic and global marketplaces for talent; (ii) institutions (both private and public) competing to attract talent from a growing global pool of researchers; and (iii) individuals and research teams looking for collaboration opportunities with their counterparts around the globe. It would be desirable to provide for better tools and techniques for improving the ability of researchers to easily and efficiently present their performance indicators from researcher-related data stored on, or sourced from, commercial and/or non-commercial databases, where presentation of such data serves two purposes: (i) encouragement of scholarly-related activity, and (ii) provision of a view of the full spectrum of a researcher's contribution to their field, in particular, and society, in general.

Therefore, there is a need for an improved method and system for creating a dashboard.

SUMMARY

According to a first broad aspect, there is provided a system for generating a dashboard containing key performance indicator information, comprising: a database comprising: an activity type table comprising a plurality of pre-configured activity types; a user activity table comprising, for each user, at least one activity each being associated with a respective pre-configured activity type; an earned badge table comprising, for each user, at least one badge each associated with at least a respective one of the at least one activity; a library comprising at least one dashboard template and at least one graphical element each associated with a respective one of the at least one badge, each dashboard template comprising a plurality of predefined location at which a respective one of the at least one graphical element is insertable and being associated with a respective pre-configured activity type; and a processor configured for, for a given user and for each one of the at least one badge associated with the given user, retrieving a corresponding graphical element from the library and inserting the retrieved graphical element at the predefined location associated with the pre-configured activity type associated with the badge to obtain a completed dashboard, and outputting the completed dashboard.

In one embodiment, each one of the at least one activity is correlated to the respective pre-configured activity type.

In one embodiment, each one of the at least one activity it correlated to the respective pre-configured activity type using a foreign key constraint.

In one embodiment, the pre-configured activity types are regrouped in at least two different categories.

In one embodiment, the at least two different categories comprise a Funding History category, a Recognitions category, a Contributions category and a Research Activities category.

In one embodiment, an appearance of the graphical element depends on the category assigned to the activity type.

In another embodiment, an appearance of the graphical element depends on the activity type.

In one embodiment, each one of the at least one badge is correlated to the at least a respective one of the at least one activity.

In one embodiment, the completed dashboard comprises a web page and a <div> tag positioned at the predefined location on the web page.

According to another broad aspect, there is provided a computer-implemented method for generating a dashboard containing key performance indicator information, comprising: receiving an activity associated with a user; determining an activity type associated with the received activity; determining a badge for the received activity, the badge being associated with the determined activity type; retrieving a graphical element corresponding to the received activity, the graphical element being indicative of a completion of the received activity by the user; inserting the graphical element into a dashboard template at a given position therein, the given position being associated with the activity type, thereby obtaining a completed dashboard; and outputting the completed dashboard.

In one embodiment, said receiving the activity comprises receiving a form completed by the user and comprising data about the activity, and extracting the activity from the form.

In another embodiment, said receiving the activity comprises transmitting a request for information about the user to an external data source terminal and receiving the activity therefrom.

In one embodiment, the method further comprises a step of transmitting the activity to the user terminal for approval and receiving a confirmation of the activity before performing said determining the activity type.

In one embodiment, the method further comprises a step of comprising inserting information about the activity type in the dashboard template.

In one embodiment, the information about the activity type comprises a name of the activity type.

According to a further broad aspect, there is provided a system for generating a dashboard containing key performance indicator information, the system comprising a processor, a communication unit and a memory, the processor being configured for: receiving an activity associated with a user; determining an activity type associated with the received activity; determining a badge for the received activity, the badge being associated with the determined activity type; retrieving a graphical element corresponding to the received activity, the graphical element being indicative of a completion of the received activity by the user; inserting the graphical element into a dashboard template at a given position therein, the given position being associated with the activity type, thereby obtaining a completed dashboard; and outputting the completed dashboard.

In one embodiment, the processor is further configured for receiving a form completed by the user and comprising data about the activity and extracting the activity from the form.

In another embodiment, the processor is further configured for transmitting a request for information about the user to an external data source terminal and receiving the activity therefrom.

In one embodiment, the processor is further configured for transmitting the activity to the user terminal for approval and receiving a confirmation of the activity before said determining the activity type.

In one embodiment, the processor is further configured for inserting information about the activity type in the dashboard template.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
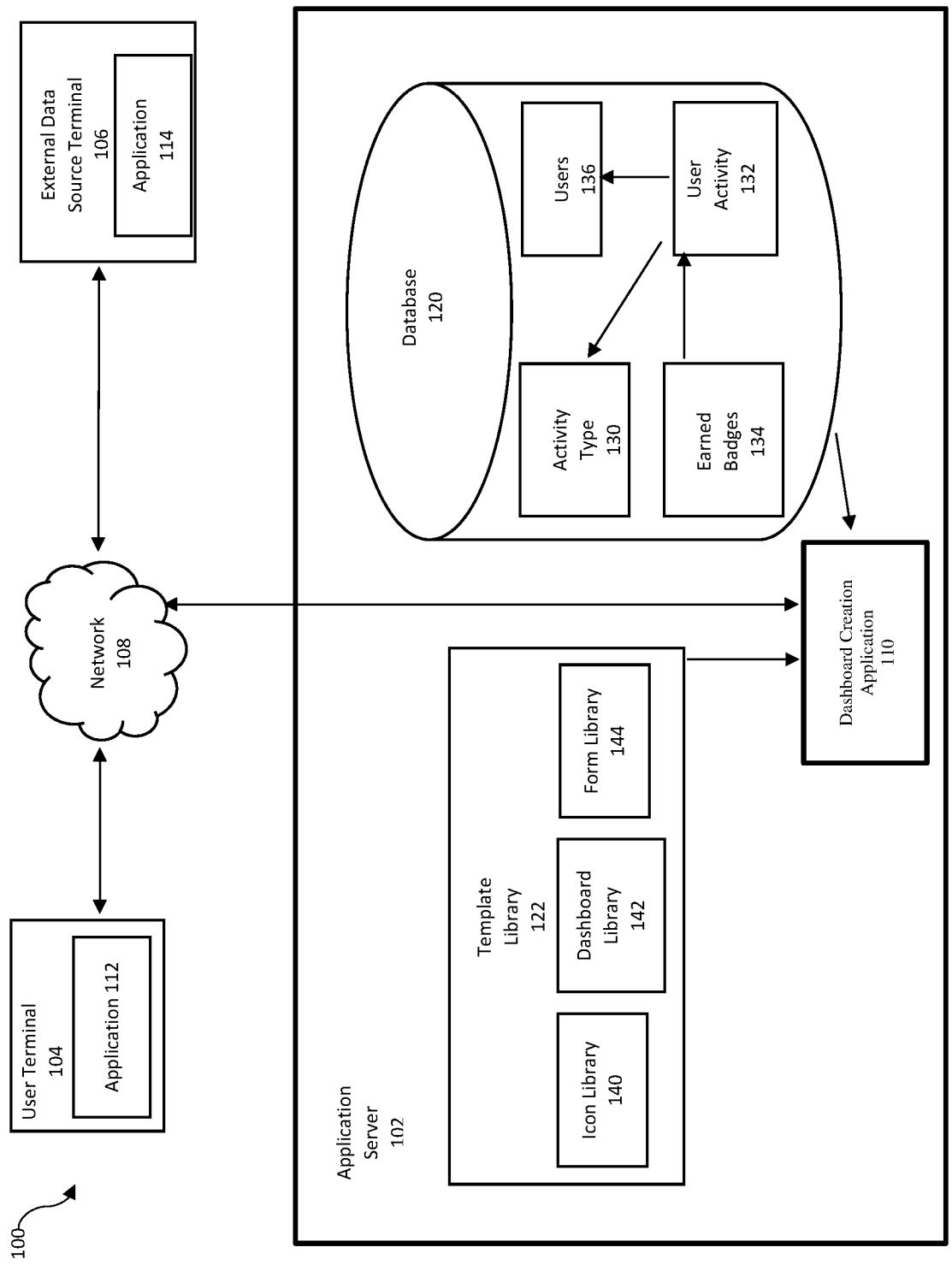
FIG. 1 is a block diagram illustrating a system for generating a dashboard, in accordance with an embodiment.

FIG. 1 illustrates one embodiment of a system 100 for generating a dashboard for the display of a user's KPIs in real-time. The system may comprise an application server 102, a user terminal 104, and an external source terminal 106 which communicate together via a network 108 such as a telecommunication network.

The application server 102, the user terminal 104, and the external data source terminal 106 each may comprise a number of components, including at least one microprocessor. Microprocessors typically control the overall operation of computer systems. Microprocessors interact with additional subcomponents such as memory storage (which may include random access memory (RAM) and read-only memory (ROM), and persistent storage such as flash memory), display, network adapter and input device(s), for example, such as a keyboard, mouse, touchscreen (which may form part of the display) or touchpad. Network adapters allow connection to different types of networks (for example, Local Area Networks (LANs) as well as Wide Area Networks (WANs)). Operating system software used by a microprocessor is typically stored in a persistent store such as flash memory or read-only memory (ROM) or similar storage. It should be understood that the operating system, specific software components, or parts thereof, may be temporarily loaded into a volatile store such as RAM. Microprocessors, in addition to operating system functions, enable execution of software components. In the exemplary embodiment in FIG. 1, the application server 102 executes a dashboard creation application 110, the user terminal 104 executes a dashboard requesting application 112 such as a browser to render a dashboard, and the external data source terminal 106 executes an information application 114.

The application server 102 may comprise the dashboard creation application 110, a database 120 containing information and a template library 122 containing templates stored therein. In the illustrated embodiment, the database 120 may comprise, but not limited to, four information categories: an activity type category 130, a user activity category 132, an earned badges category 134 and a user information category 136. In the illustrated embodiment, the template library 122 may comprise, but not limited to, three template categories: an icon library 140 containing graphical elements such as badges or icons, a dashboard library 142 comprising dashboard templates and a form library 144 containing forms to be filled out by users.

The activity type category 130 may comprise a list of pre-configured types of activity or KPIs that may be selected by a user to create her/his dashboard. In one embodiment, the pre-configured categories may comprise of, but not limited to, four groups of pre-configured activity types: Funding History, Recognitions, Contributions and Research Activities. Each group of pre-configured activities comprise at least one pre-configured activity associated thereto.

In one embodiment, the funding history group may comprise of, but not limited to, the following pre-configured activities or KPIs: Commercial Grants and Non-Commercial Grants.

In one embodiment, the recognitions group may comprise of, but not limited to, the following pre-configured activities or KPIs: Awards, Prizes and Nobel Prize.

In one embodiment, the contributions group may comprise of, but not limited to, the following pre-configured activities or KPIs: Reports, Online Resources, Patents, Presentations, Peer-Reviewed Articles, Non-Peer-Reviewed Articles, Working Papers, Book Chapters, Book Reviews, Dissertations, Conference Proceedings, Books, Knowledge Advancement on the platform (measuring user engagement in knowledge exchange with others on the platform), Newspaper Articles, Magazine Articles, Blogs, Computer Program, Webpages, and Edited Books.

In one embodiment, the research activities group may comprise of, but not limited to, the following pre-configured activities or KPIs: Committee Memberships, Community and Volunteer, International Collaboration, Organizational Review, Editorial and Review, Conference Review, Graduate Examination, Tenure Promotion Assessment, Research Funding Application Review, Expert Witness, Course Teaching, Course Development, Program Development, Student Supervision, Event Administration, and Mentoring.

The user activity category 132 may comprise for each user an indication of the list of the activities associated with the user, i.e. activities that have been completed by the user. Each activity listed in the user activity category 132 is associated with at least one pre-configured activity type. In one embodiment, the user activity category 132 may comprise an identification of whether or not a given pre-configured activity type is associated with a user. In one embodiment, the user activity category 132 may further comprise the number of activities associated with a given pre-configured activity type for each user, such as the number of peer-reviewed articles associated with a user, the number of awards associated with the user, etc. In the same or another embodiment, the user activity category 132 may comprise a description of all of the activities associated with a user such as the bibliographical information of an article or a book, the name and year of an award, etc.

The earned badges category 134 may comprise for each user an identification of the badges associated with each user. As described below, each earned badge may be linked to a particular icon design available in the icon library 140.

The user information category 136 may comprise information about users, such as user identification (ID), user contact information, employment information, education information, etc.

As described above, the template library 122 may comprise, but not limited to, an icon library 140, a dashboard library 142 and a form library 144. The icon library 140 comprises at least one graphical element representing a badge, an icon, etc. In an embodiment in which the activity type library 130 comprises at least two activity categories, the template library 140 may comprise at least two different graphical elements, each representing a badge and each associated with a respective activity type. In one embodiment in which the activity type library 130 comprises four different activity type categories, the icon library 140 may comprise four different graphical elements having a different shape and/or color and each graphical element is associated with a respective activity type category.

The dashboard library 142 comprises a least one template for a dashboard to be displayed on user terminals. In one embodiment, a dashboard template is an image to be displayed on the user terminal 104 and graphical elements are insertable within the image each at a respective predefined location within the image. Each predefined location within the dashboard template is associated with a respective pre-configured activity type and/or a respective activity type category.

The form library 144 comprises at least one form to be transmitted to a user. Each form comprises questions regarding the activities that a user may have performed. In one embodiment in which the activity type library 130 comprises four different activity categories or groups, the form library 144 may comprises four pre-defined forms each to be filled-out by a user to determine the activities that should be associated with the user.

Referring back to FIG. 1, the application server 102 may be provided with the dashboard creation application 110. Upon execution, the dashboard creation application 110 may facilitate the exchange of data over the network 108 with the user terminal 104 and the external source terminal 106. The dashboard creation application 110 may allow for creating a user account, transmitting a from form the form library 144 to a user terminal 104, receiving a populated form from the user terminal 104, extracting information from the populated form and populating the database 120 accordingly, requesting and receiving information from the external data source terminal 106, generating a dashboard upon request from a user terminal 104 and transmitting a generated dashboard to a user terminal 104, etc. It should be understood that the server 102 may be provided with more than one application each configured for executing at least one of the above-listed actions.

The user terminal 104 is provided with a dashboard requesting application 112. Upon execution, the dashboard requesting application 112 allows for transmitting data to the server 102 and receiving data therefrom. For example, the dashboard requesting application 112 may allow for receiving a form, transmitting a populated form, receiving a dashboard and displaying the dashboard. It should be understood that the user terminal 104 may be provided with more than one application each configured for executing at least one of the above-listed actions.

The external data source terminal 106 may be provided with an information application 114. Upon execution, the information application 114 may allow for the receipt of an information request from the server 102 and transmitting information to the server 102, as described below.

Figure 2:
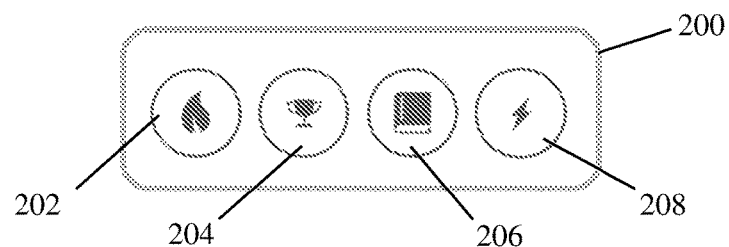
FIG. 2 illustrates an exemplary minimal version of a dashboard.

FIG. 2 illustrates one embodiment of a dashboard 200 for displaying "earned" and "not earned" badges. In the illustrated embodiment, the dashboard 200 comprises four graphical elements 202, 204, 206 and 208 each associated with a respective type of activity or KPI stored in the activity type table 130. Each graphical element 202, 204, 206, 208 comprises a circle positioned at a desired position in the dashboard corresponding to a given activity type, and a respective badge icon is inserted into the circle. Each badge icon corresponds to a respective activity type. In the illustrated embodiment, each circle is provided with a respective badge icon therein, thereby indicating that each activity type is associated with the user, i.e. the user has at least one KPI associated with each activity type and was, therefore, awarded the relevant badge. If, on the other hand, the user did not perform a particular badge-worthy activity, the system 100 may determine that the user does not merit the award of a badge. In this latter case, rather than being represented by a circle with a badge icon in the middle, a graphical element 202, 204, 206, and/or 208 would, instead, be represented by a circle with a void in the middle or an empty circle (i.e., a circle without a badge icon in the middle) to evidence the fact that the user was not awarded a badge for the relevant KPI contained in the activity type associated with the given graphical element 202, 204, 206, 208.

In one embodiment, the position of a circle within the dashboard is related to a respective activity type so that each activity type is visually represented by a circle having a respective position within the dashboard. The presence of a badge within a given circle indicates that the user has at least one KPI belonging to the activity type associated with the given circle.

Figure 3:
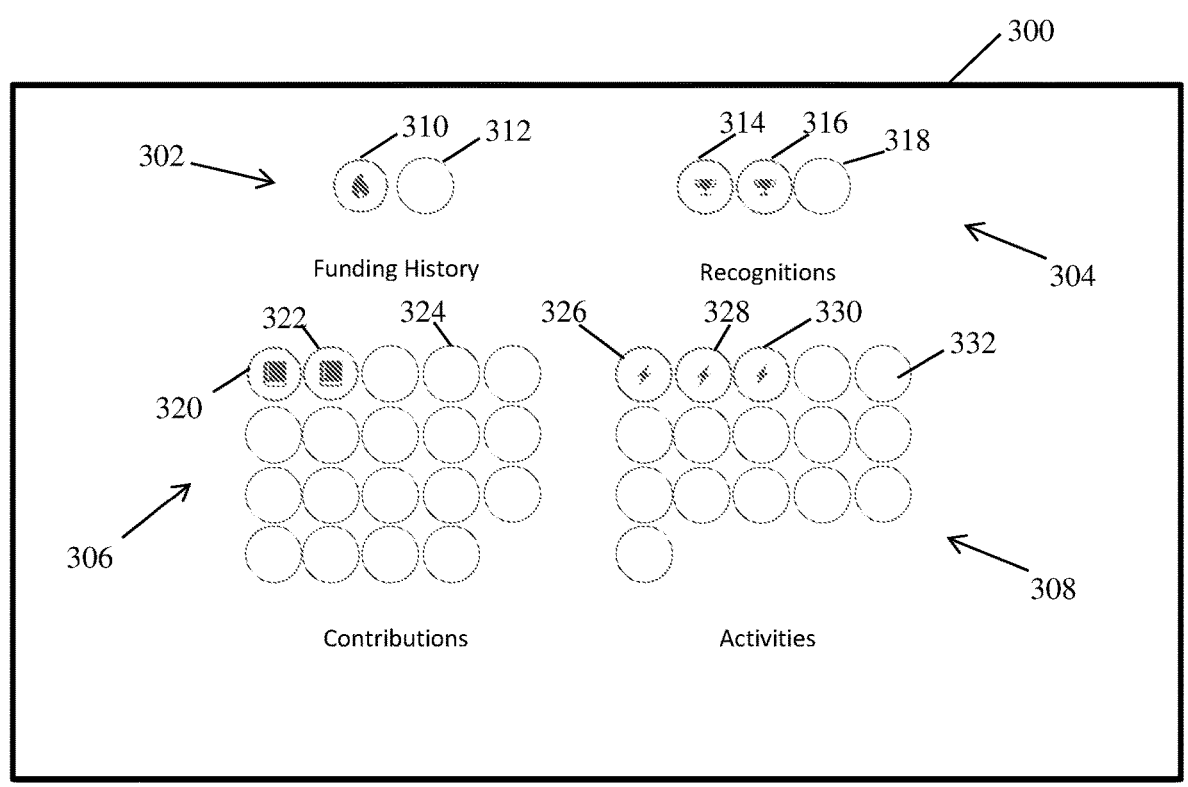
FIG. 3 illustrates an exemplary expanded version of a dashboard.

FIG. 3 illustrates one embodiment of an extended dashboard 300 also for displaying "earned" and "not earned" badges. The dashboard 300 comprises four groups of graphical elements 302, 304, 306 and 308 each associated with a respective activity type category. In one embodiment, the group 302 corresponds with the funding history activity type category (showcasing user's ability to secure research funding) and comprises of two graphical elements 310 and 312, each associated with a corresponding KPI or activity type. The graphical element 310 comprises a circle having a badge icon inserted therein to indicate that the user has the corresponding KPI, e.g. user successfully securing a commercial grant for their research activities, while the graphical element 312 comprises an empty circle to show that the user does not have the corresponding KPI, e.g. user is yet to secure non-commercial grant for their research activities. The absence of a badge icon in the graphical element 312 indicates that the user has not earned the corresponding badge.

The group 304 corresponds to the recognition activity type category (showcasing user's receipt of recognitions for their efforts) and comprises three graphical elements each associated with a respective KPI belonging to the recognition activity type category. The graphical element 314 comprises of a circle having a badge icon inserted therein to indicate that the user earned the corresponding KPI, e.g. awards, and the graphical element 316 also comprises a circle having a badge icon inserted therein to show that the user has the corresponding KPI, e.g. prizes. However, the graphical element 318 comprises only an empty circle to show that the user does not have the associated KPI, e.g. Nobel prize.

The group 306 corresponds to the contributions activity type category (showcasing user's engagement in scholarship and research dissemination activities) and comprises of nineteen graphical elements 320, 322 and 324. The first graphical element 320 comprises a circle having a badge icon inserted therein to indicate that the user earned the corresponding KPI, e.g. the publication of reports. Similarly, the second graphical element 322 also comprises of a circle having a badge icon inserted therein to indicate that the user obtained the corresponding KPI, the publication of online resources. The seventeen remaining graphical elements 324, each comprising of an empty circle, indicate that the user is yet to earn any of the KPIs associated with these graphical elements.

The last group 308 corresponds with the research activity type category (showcasing user's engagement in knowledge dissemination activities) and comprises sixteen graphical elements 326, 328, 330 and 332. The first graphical element 326 comprises a circle having a badge icon inserted therein to indicate that the user has the corresponding KPI, e.g. participation in committee memberships. Similarly, the second graphical element 328 also comprises a circle having a badge icon inserted therein to indicate that the user has the corresponding KPI, participation in community and volunteer initiatives. The third graphical element 330 comprises a circle having a badge icon inserted therein to indicate that the user has the corresponding KPI, e.g. participation in international collaboration efforts. The remaining thirteen graphical elements 332, each comprising of an empty circle, indicate that the user is yet to earn any of the KPIs associated with these graphical elements.

In one embodiment, the position of a circle within the dashboard is related to a respective KPI so that each pre-configured activity type is visually represented by a circle having a respective position within the dashboard. The presence of a badge icon within a given circle indicates that the user has the corresponding KPI.

It should be understood that a dashboard template corresponds to a dashboard containing placeholders in a pre-configured arrangement, where such placeholders get populated with circles containing badge icons or empty circles, for example, depending on the circumstances and graphical choice of the dashboard's designer. For example, the template corresponding to the dashboard 200 corresponds to the dashboard illustrated in FIG. 2 containing at least four badge icons, i.e. with at least one badge awarded in each of the four main activity type categories.

While the badge icons for different activity categories are different, it should be understood that a same badge icon may be used for all of the activity categories.

Figure 4:
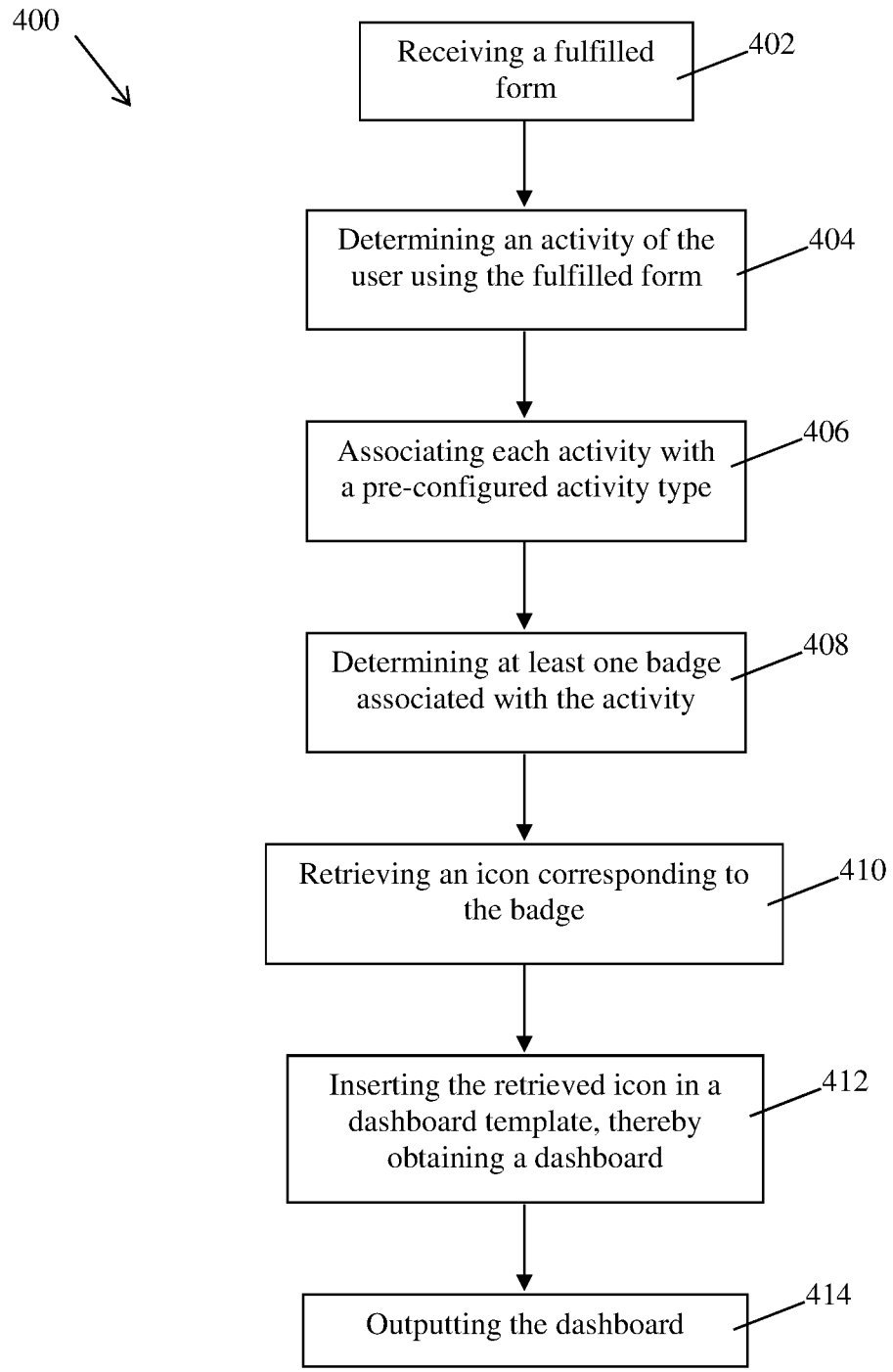
FIG. 4 is a flow chart illustrating a computer-implemented method for generating a dashboard, in accordance with an embodiment.

FIG. 4 illustrates one embodiment of a computer-implemented method 400 for creating a dashboard such as dashboard 200 or 300. While the method 400 is described while being implemented by the system 100, it should be understood that systems other than the system 100 may execute the method 400.

First a user may connect to the server 102 and create an account by providing a username, a password and other user information deemed necessary or relevant by the system's designer or administrator. A user account comprising a user ID is created and stored in the user table 136.

The server 102 may then retrieve at least one form from the form library 144 and transmit the form to the user terminal 104. The form comprises at least one field to be filled out by the user. Each field may be associated with a given activity type and/or a given activity. The user may then fill out the form by inputting the relevant information in the associated field. The populated form is then transmitted from the user terminal 104 to the server 102.

In step 402, the server receives the form that has been filled out by the user. In step 404, the server extracts the information from the received form and determines at least one activity described in the form by the user from the extracted information. The determined activity may then be stored in the user activity table 132 and linked to the user ID or account stored in the user table 136.

In step 406, an activity type is determined and associated with the determined activity. In one embodiment, each field of the form is associated with a corresponding activity type. Fields may also be regrouped as activity type categories. In this case, the activity type assigned to the determined activity corresponds with the activity type associated with the field of the form from which the activity has been extracted. A link is then created between the activity stored in the user table 132 and its corresponding activity type stored in the activity type table 130.

In step 408, at least one earned badge is determined for the determined activity. The determined badge may then be stored in the earned badge table 134. A link may then be created between the activity stored in the user activity table 132 and the respective badge stored in the earned badge table 134. It should be understood that the same badge may be linked to more than one activity completed by the user and recorded in the system.

In step 410, a graphical element, such as an icon corresponding the earned badge, is retrieved form the icon library 140 and a dashboard template is retrieved from the dashboard library 142. In step 412, the retrieved icon is then inserted into the dashboard template at its respective position corresponding to the associated activity type within the dashboard template, thereby obtaining a completed dashboard.

The completed dashboard is then outputted in step 414. The completed dashboard may be stored in memory. In the same or another embodiment, the completed dashboard is transmitted to the user terminal 104 to be displayed thereon.

In the following, there is described a particular implementation of the method 400 for creating a dashboard.

When a user records an activity, a respective record may be created in the user table 132 and correlated without exception to a respective activity-type stored in the activity type table 130. In one embodiment, this correlation may be performed in accordance with foreign key constraints, where the activity-type identification in the activity type table 130, serves as a foreign key in the user activity table 132. A Boolean indicator of whether the activity type merits the award of a badge may be associated with the activity type in the activity type table 130.

In one embodiment, the server 102 sets an upper limit on the number of badge-types that can be awarded per each activity. This maximum number is also stored in the activity type table 130. For example, a designer of the system 100 may set an upper limit of sixteen badge-types for activities belonging to the research activity type. Such a limit ensures that the total number of badge-types awarded for the research activity category is in the range of [0 . . . 16].

A user is provided with a form wherein the user can indicate details about the activity that he intends to register on the system 100. Upon submission of the completed form, the form's data is extracted by the server 102, resulting in a new entry in the user activity table 132. This new entry is associated with the user's ID in the user activity table 132 along with the activity-type so that it can be joined with the activity type table 130 when necessary in order to determine (i) the activity type of a given activity in the user activity table 132, and (ii) any badge-related information, such as whether a badge should be granted and the number of badges that should be granted.

In one embodiment, the process of associating the user's ID with the relevant activity-type involves a search of the activity metadata using the activity type search key. If the metadata search indicates that the activity earns a badge, then the server 102 fetches the maximum number of badges a given activity should be granted, which is determined by a field in the activity type table 130. The number of badges the user earns for the new activity type is counted through a scan of all the rows in the badges table that match the user's ID and the corresponding activity type. The earned badges table 134 contains all the badges awarded to the user by the server 102, as well as foreign keys to the user activity table 132.

Whenever an activity is registered in the user activity table 132, an automated scan of the earned badges table 134, for the same activity type and user ID combination is conducted. This allows the server 102 to obtain the total count matches. If the number of badges the user earned is less than the allowable maximum for the particular activity type, then the user is awarded a new badge. An award of a new badge type triggers a simultaneous creation of a new row in earned badges table 134 in order to indicate that the badge earned was associated with the user activity table 132.

In one embodiment, the method 400 comprises of the further step of importing data from the external data source terminal 106. The external data source terminal may comprise a database containing information about user activities, such as information about scientific papers, conferences, etc. The server 102 may transmit a request for information containing at least the name of the user to the external data source terminal 106 which determines whether some activities are associated with the given user and transmits the retrieved activities, if any, to the server 102.

In one embodiment, the server 102 may record the activities received from the external data source terminal 106 following the same process followed for recording activities extracted from a form populated by a user.

In one embodiment, before recording the activities received from the external data source terminal 106, the server 102 may transmit these activities to the user's terminal 104 for validation by the user. The server 102 then records only the activities that have been validated by the user.

In one embodiment, the user has an opportunity to (i) review, (ii) make corrections, if any, (iii) save or (iv) delete the activities imported from the external data source terminal 106. If the user elects to delete or not to memorialize an imported activity, then no record is created in the database 120. If, on the other hand, the user decides to save an imported activity (whether after editing the record or "as is"), the process described above for recording an activity and awarding a respective badge type, if any, is repeated.

In one embodiment, the server 102 allows a user to edit his/her activities (for example, changing an entry from Course Teaching to Editorial & Review activity). In this case, where the user changes the characterization of an already recorded activity, in order to avoid misattribution of badges, the server 102 may perform the following steps. First, when an activity is edited, any badge associated with the corresponding activity type is invalidated in the earned badges table 134. That is, any corresponding badge, if available, is removed from the earned badges table 134. To accomplish this, a search of the badge ID in the earned badges table 134 is conducted of a badge whose activity ID foreign key matches the ID of the corresponding activity stored in the user activity table 132 that is being edited. Second, when the edited activity is saved, a process similar to that of earning a badge described above is repeated. That is, the newly edited activity is treated as if the user recorded an activity anew. If, on the other hand, the record editing performed by the user is in the form of deletion of the relevant activity, the activity is invalidated and any corresponding badge, if previously awarded, is removed from the earned badges table 134. To accomplish this, a search is conducted for a badge with the activity ID number from the user activity table 132, in the activity foreign key in the earned badges table 134. Upon identification of the record, the corresponding activity ID is removed from the user activity table 132.

In one embodiment, the dashboard is displayed in a web browser. When the web page containing placeholders/fields for each activity type, hosting the dashboard is rendered using a <div> tag positioned in a predefined location on the web page. Each placeholder represents a specific badge and is assigned a specific ID or class that can be used for referencing during the process. Other embodiments may use other container tags or bitmaps, among other things, instead of a <div> tag. The number of placeholders allocated for each activity type depends on the maximum number of badges assigned to the activity type by activity metadata, the determination of which is accomplished by the performance of search on the user activity table 132.

In one embodiment, as the container is rendered, creating the dashboard display, the system 100 assigns the appropriate bitmap, representing a badge icon from the icon library 140 to the respective placeholder in order to reflect earned badges listed in earned badges table 134. In one embodiment, when an activity type is associated with a badge type that has not been awarded to the user, such unearned badge is rendered using a different kind of bitmap in order to reflect that the badge has not been awarded.

In one embodiment, the user can also interact with the dashboard through a web browser in order to access additional information. For example, the user may interact with the dashboard by selecting a given graphical element such as an empty circle or a badge. In one embodiment, the selection may be made by positioning the cursor of a mouse on a graphical element and optionally clicking on a button of the mouse. Information about the category type such as the name of the category associated with the selected graphical element is then inserted into the dashboard and the updated dashboard is transmitted to the user terminal 104 for being displayed thereon. When a badge is selected, additional information such as the number of activities belonging to the category type may also be inserted into the dashboard and the updated dashboard is transmitted to the user terminal 104 for being displayed thereon.

Figure 5:
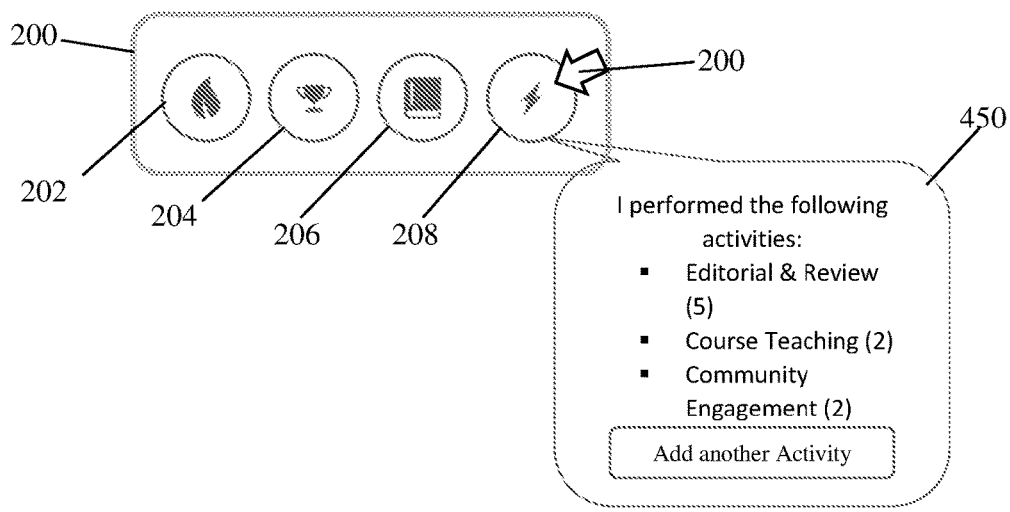
FIG. 5 illustrates the dashboard of FIG. 2 further comprising a popover for displaying information, in accordance with an embodiment.

FIG. 5 illustrates an exemplary interaction with the dashboard 200. For example, where the cursor 210 of the mouse hovers over an icon representing an activity-type, a popover 450 opens, displaying (i) a detailed list of badge-types awarded along with the corresponding quantity for the relevant badge-type, and (ii) a button allowing the user to add another activity.

Figure 6:
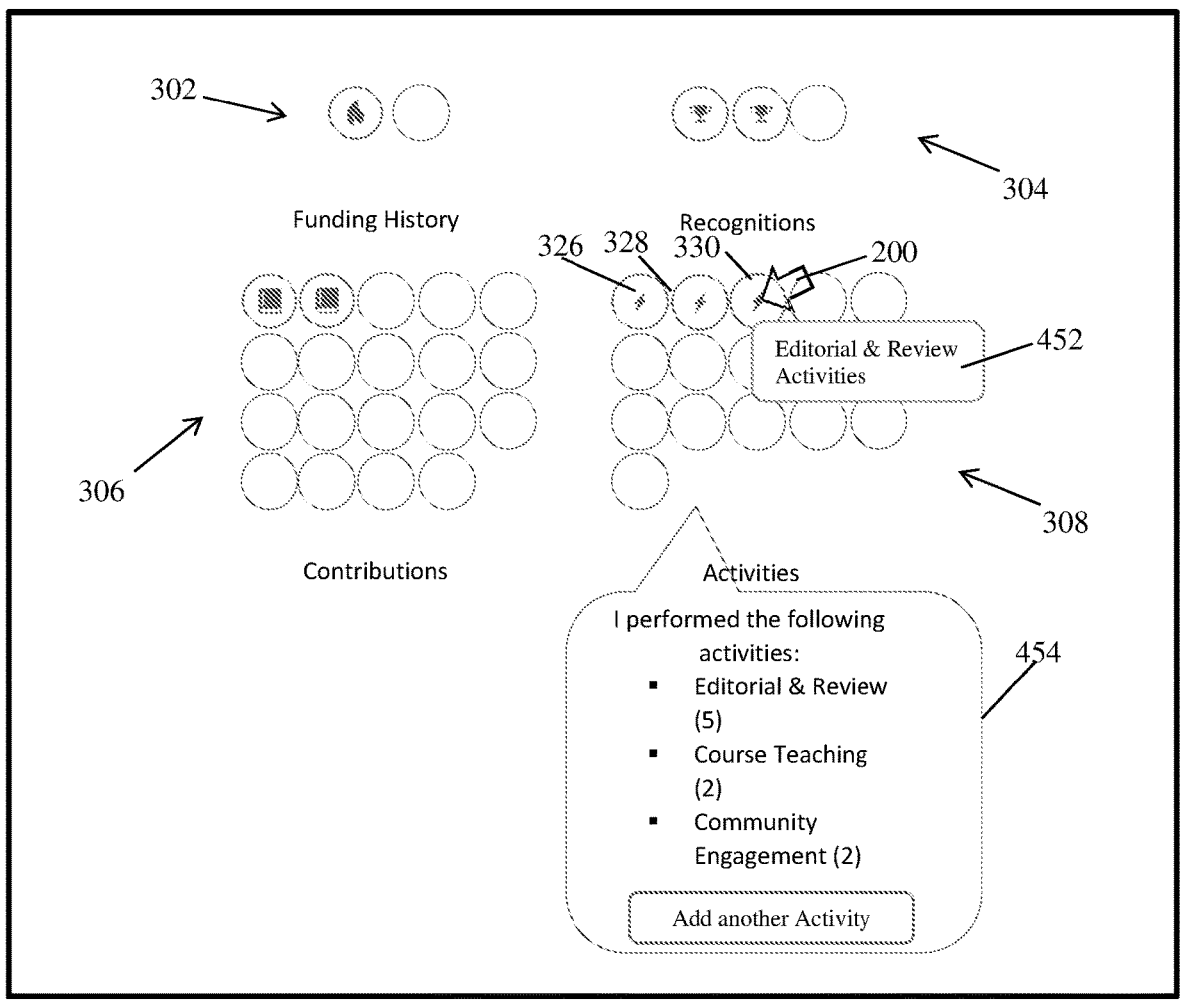
FIG. 6 illustrates the dashboard of FIG. 3 further comprising a popover and panel for displaying information, in accordance with an embodiment.

FIG. 6 illustrates an exemplary interaction with the dashboard 300. For example, a mouse hover over a badge area, opens a popover 452 displaying the badge type. A mouse hover over the activity-type category expands the relevant panel 454 to show (i) a detailed list of badge-types awarded along with the corresponding quantity for the relevant badge-type, and (ii) a button allowing the user to add another activity.

It should be understood that other embodiments may display other types of metrics that are relevant to the activity-type and related badge-types displayed on the dashboard.

Figure 7:
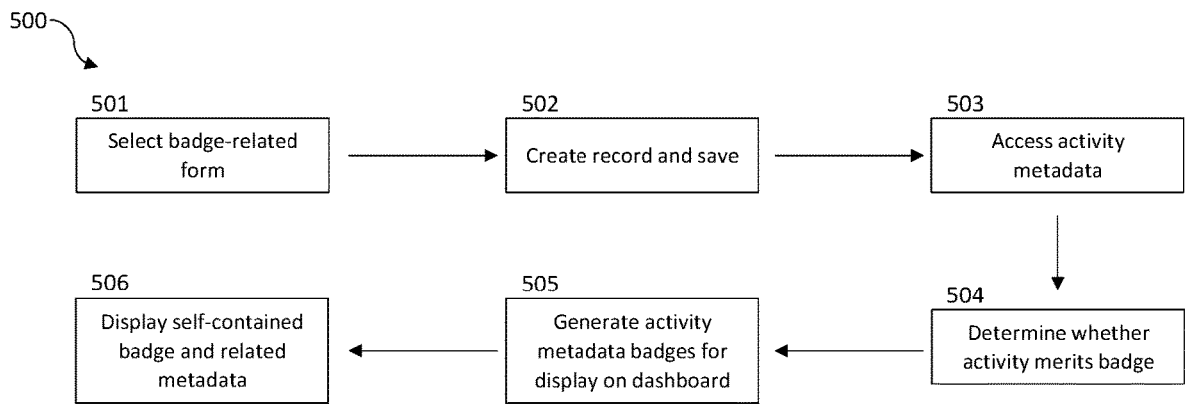
FIG. 7 is a flow chart illustrating a computer-implemented method for generating a self-contained badge object, in accordance with an embodiment.

FIG. 7 illustrates an exemplary computer-implemented method, 500, for generating self-contained badge object. The method 500 may be carried out on a system such as system 100. The method 500 may begin, for example, when the user selects a badge-related form from the form library 144, at step 501. After the user fills the relevant information in the form and elects to save the record at step 502, the server 102 accesses the activity metadata in the database 120, at step 503, to determine whether the activity belongs to a category of activities that earn a badge. If it determines that the activity recorded merits the award of a badge at step 504, then the server 102 may access the badge icon library 140 to generate activity metadata badges for display on the dashboard, 505. The system 100 then displays the dashboard along with relevant badges and related metadata, at step 506. The activity metadata stored in database may be used to generate one or more metadata objects.

Figure 8:
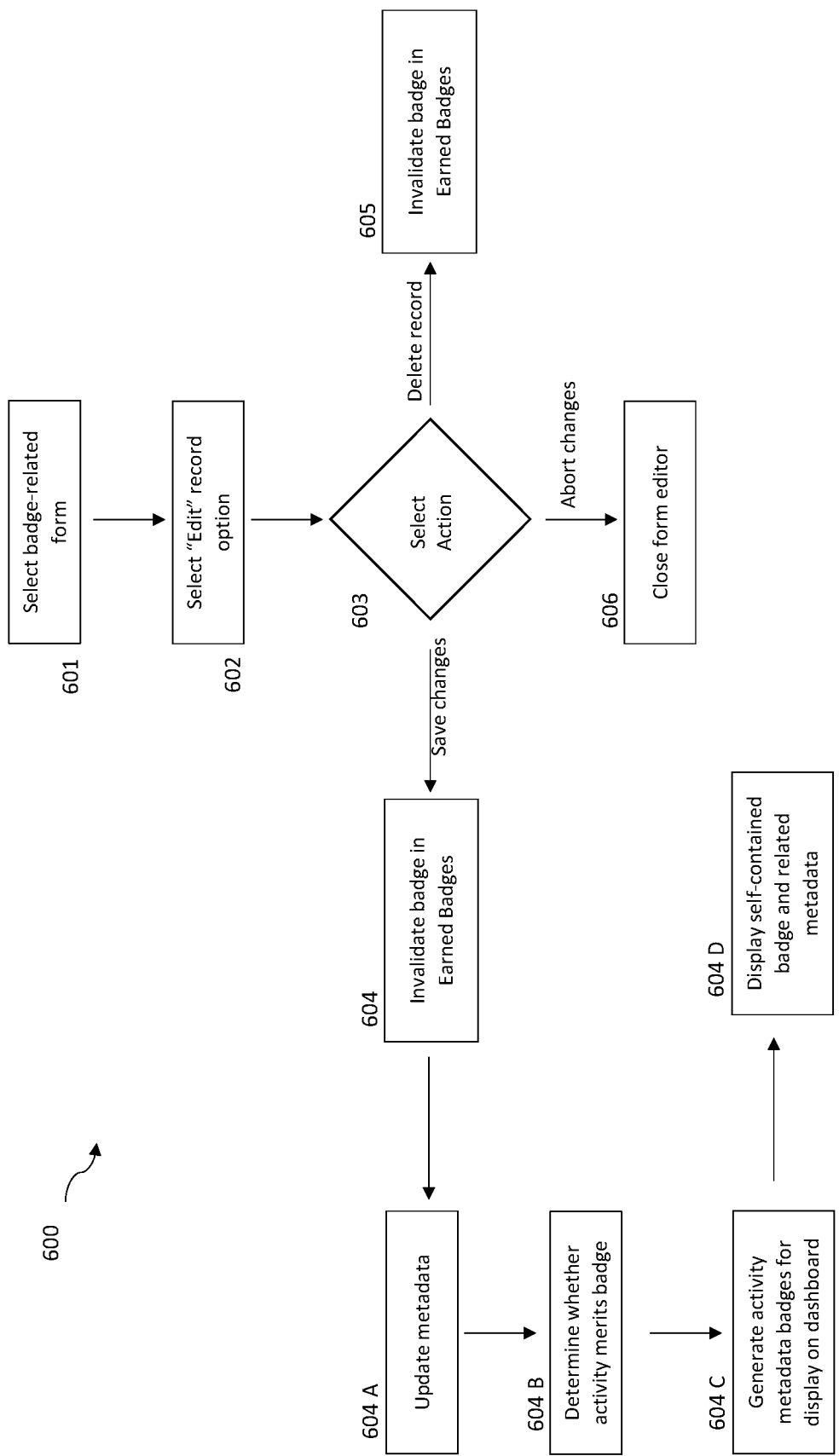
FIG. 8 is a flow chart illustrating a computer-implemented method for editing a badge that has been awarded to the user, in accordance with an embodiment.

FIG. 8 illustrates an exemplary computer-implemented method 600 for editing a badge that has been awarded to the user. The method 600 may be carried out on a system, like system 100. The method 600 may begin, for example, when the user selects a badge-related form, at step 601, and click on the "Edit" button in the form. The user now needs to decide, at step 603, whether to (i) delete the record, (ii) edit the record, or (iii) abandon/abort changes. If she/he opts for deleting the record, the badge is invalidated in the earned badges table 134, at step 605. If, on the other hand, they opt for editing the record, the badge is invalidated in the earned badges table 134, at step 604. The system 100 then updates the activity metadata, at step 604 A. The system 100 must then determine whether the updated activity merits a badge, at step 604 B, and generate activity metadata badges for display accordingly, at step 604 C. The updated dashboard containing badges and related metadata is displayed, at step 604 D. Finally, the user can elect to abandon editing the badge-related form, and close the form editor, at step 606, at which point the system 100 does not register any changes.

Figure 9:
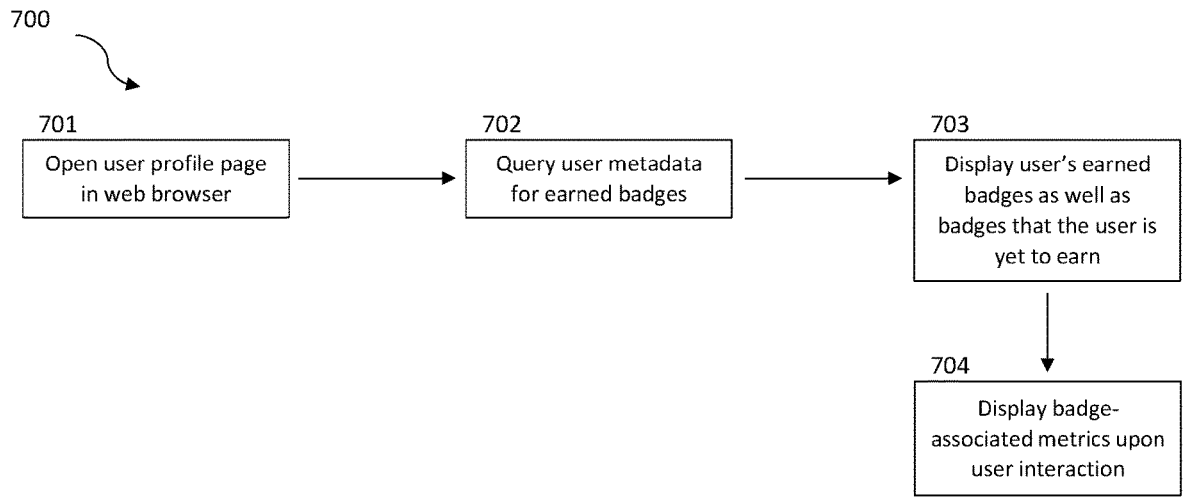
FIG. 9 is a flow chart illustrating a computer-implemented method for the visual rendering of a user-centered dashboard, in accordance with an embodiment.

FIG. 9 illustrates an exemplary computer-implemented method 700 for the visual rendering of a user-centered dashboard. The method 700 may be carried out on a system, like system 100. The method 700 may begin, for example, when the user opens a user profile page in a web browser, at step 701. The web browser communicates with the system 100 and queries user metadata for badges earned, at step 702. The dashboard container is rendered on screen displaying the badges that the user earned and those that they are yet to earn, at step 703. When the user interacts with the dashboard with the curser, the dashboard displays additional badge-related metrics, at step 704.

Figure 10:
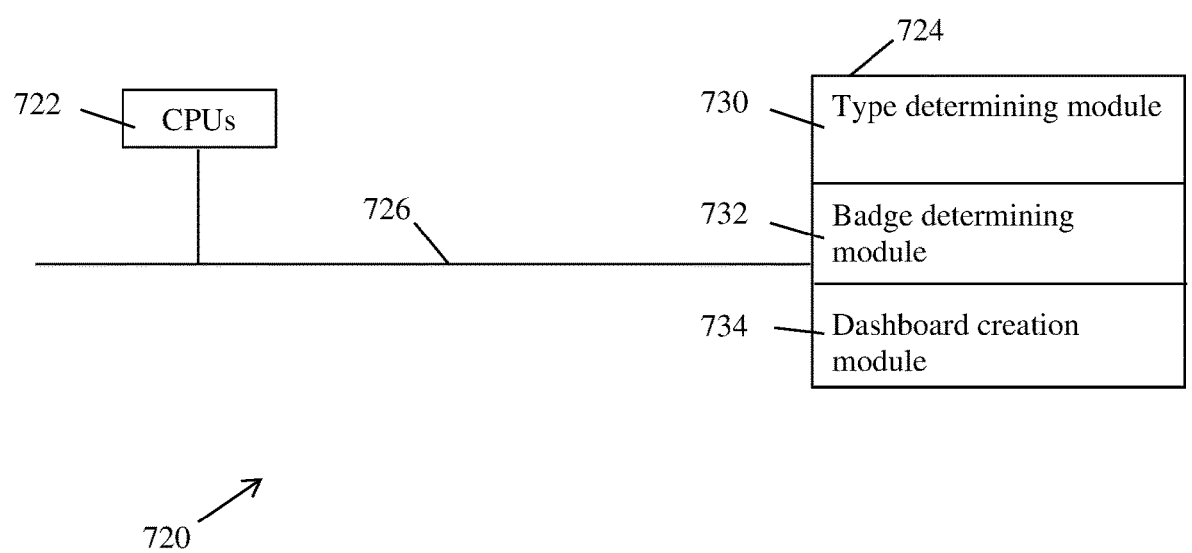
FIG. 10 is a block diagram of a processing module adapted to execute at least some of the steps of the computer-implemented method of FIG. 4, in accordance with an embodiment.

FIG. 10 is a block diagram illustrating an exemplary processing module 720 for executing the steps 402 to 414 of the method 400, in accordance with some embodiments. The processing module 720 typically includes one or more Computer Processing Units (CPUs) and/or Graphic Processing Units (GPUs) 722 for executing modules or programs and/or instructions stored in memory 724 and thereby performing processing operations, memory 724, and one or more communication buses 726 for interconnecting these components. The communication buses 726 optionally include circuitry (sometimes called a chipset) that interconnects and controls communications between system components. The memory 724 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 724 optionally includes one or more storage devices remotely located from the CPU(s) 722. The memory 724, or alternately the non-volatile memory device(s) within the memory 724, comprises a non-transitory computer readable storage medium. In some embodiments, the memory 724, or the computer readable storage medium of the memory 724 stores the following programs, modules, and data structures, or a subset thereof:

a type determining module 730 for determining the activity type associated with a received activity;

a badge determining module 732 for determining whether a badge should be earned for the received activity; and a dashboard creation module 734 for retrieving and inserting a graphical element associated with the activity type into a dashboard template and outputting the completed dashboard.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 724 may store a subset of the modules and data structures identified above. Furthermore, the memory 724 may store additional modules and data structures not described above.

Although it shows a processing module 720, FIG. 10 is intended more as functional description of the various features which may be present in a management module than as a structural schematic of the embodiments described herein. In practice, and as recognized by those of ordinary skill in the art, items shown separately could be combined and some items could be separated.

It should be understood that dashboard visualization format is not limited to the examples presented above and can manifest itself in many graphical forms ranging from the expanded to the minimal version. Different variations of the dashboard may be available to users from a menu of dashboard templates via their user settings function. The decision to adopt and implement a particular visual version of the dashboard may depend on any number of factors including, among others, aesthetic preferences and available space for the dashboard's display in a web browser.

In one embodiment, the interaction and communication with the server 102 is carried out by the user using a web browser by means of a capable device, including, but not limited to, computer, tablet, or mobile phone. User requests sent to the server 102, via a web browser may utilize Asynchronous JavaScript and XML (AJAX) technology, or similar technologies. In one embodiment, the dashboard is rendered and generated using an application layer such as a PHP: Hypertext Processor application (also referred to as PHP application) application into HTML format for display on a web browser automatically upon accessing the user's profile page containing the relevant uniform resource locator (URL) address.

In one embodiment, the web browser communicates over the network 108 with the data sources, comprising of both external data sources 106 and internal database 120. The illustrated embodiment uses a cloud-based network 108. However, the present dashboard creation can be performed in a cloud computing, client-server, or standalone computer processing environment, or any combination thereof. In some embodiments, any of the components of the system 100 may be located in a singular cloud or network, or spread among many clouds or networks utilizing one or more data centers and configured to share resources over the network. In other embodiments, the system 100 can comprise of a single computer or server having a processor and memory, whereby the processor is configured to carry out the instructions of a computer program stored in the memory. End-user knowledge of the physical location and configurations of the components of the system 100 is not required.

It should be understood that the quantity and names of the pre-configured activity types contained in the activity type table 130 can vary based on system designer's preferences.

To allow for design flexibility, a variety of dashboard templates, accessible from the dashboard library 142 can be employed by system's designers based on their unique circumstances and needs.

While the above-described embodiments use a relational database for illustration purposes, it should be understood that the database can be any type of database management system, including, but not limited to, NoSQL, CSV, or flat text file.

In one embodiment, the present system and method allow for the creation of a dashboard displaying various "earned" and "not earned" badge-types, providing for an overview of a user's success in achieving certain performance targets and goals in particular activity areas.

In one embodiment, the dashboards are designed to allow the user to provide a comprehensive view of the performance, engagement and contribution of users to their field as possible through the adoption of a broad, rather than narrow, focus. As such, the dashboards can be said to be user-centered dashboard. In some embodiments, the dashboards utilize categorized badges representing KPIs, offering positive reinforcement and feedback mechanisms of rewards and recognition to the user in real-time in addition to badge-related metrics.

It should be understood that the above-described methods may each be embodied as a system comprising a processing unit or processor, communications means and a memory for storing the database 120, the library 122 and statements and instructions that when executed by the processor perform the steps of the method.

The embodiments of the invention described above are intended to be exemplary only. The scope of the invention is therefore intended to be limited solely by the scope of the appended claims.

The invention claimed is:

1. A system for generating a dashboard containing key performance indicator information, comprising:
   a database comprising:
   an activity type table comprising a plurality of pre-configured activity types;
   a user activity table comprising, for each user, at least one determined activity, wherein each of the at least one determined activity is associated with a different respective pre-configured activity type; and
   an earned badge table comprising, a plurality of badges, wherein each of the badges is associated with at least a respective one of the at least one determined activity, and each badge is associated with at least one user;
   a library comprising a plurality of dashboard templates and a plurality of graphical elements, wherein each dashboard template has a different aesthetic, wherein each of the plurality of graphical elements is associated with a respective one of the plurality of badges, where, each dashboard template comprises more than one group of predefined locations, wherein each of the groups of predefined locations are associated with a different respective pre-configured activity type, and each predefined location within a group is configured to receive only graphical elements associated with the pre-configured activity type associated with the group; and
   a processor configured to, for a given user and for each badge associated with the given user, retrieving the badge's corresponding graphical element from the library and inserting the retrieved graphical element in one of the predefined locations within the group of predefined predefined locations associated with the pre-configured activity type associated with the badge to obtain a completed dashboard, and outputting the completed dashboard.

2. The system of claim 1, wherein each one of the at least one determined activity is correlated to the determined activity's respective pre-configured activity type using a foreign key constraint.

3. The system of claim 1, wherein the pre-configured activity types are regrouped in at least two different categories.

4. The system of claim 3, wherein the at least two different categories comprise a Funding History category, a Recognitions category, a Contributions category and a Research Activities category.

5. The system of claim 3, wherein an appearance of each of the plurality of graphical elements depends on the category assigned to the activity type.

6. The system of claim 1, wherein an appearance of each of the graphical plurality of graphical elements depends on the activity type.

7. The system of claim 1, wherein the completed dashboard comprises a web page and a <div> tag positioned at the predefined location on the web page.

8. A method for generating a dashboard containing key performance indicator information, comprising:
   receiving at least one activity associated with a user;
   for each of the at least one received activity, determining an activity type, from a plurality of pre-configured activity types, which is associated with the received activity, wherein each of the at least one determined activity is associated with a different respective pre-configured activity type;
   for each of the at least one determined activity, selecting a badge for the received activity from plurality of badges, wherein each of the at least one determined badge being associated with at least a respective one of the at least one determined activity, and each of the determined at least one badge is associated with the user;
   for each of the at least one determined activity, retrieving a graphical element corresponding to the determined activity from a plurality of graphical elements, wherein each of the plurality of graphical elements is associated with a respective on of the plurality of badges, wherein each of the at least one retrieved graphical element is indicative of a completion of the graphical element's associated activity by the user;
   selecting a dashboard template from a plurality of dashboard templates, wherein each dashboard template has a different aesthetic, each of the plurality of dashboard templates has a different aesthetic, each of the plurality of dashboard templates comprises more than one group of predefined locations, each of the groups of predefined locations are associated with a different respective pre-configured activity type, and each predefined location within a group is configured to receive only graphical elements associated with the pre-configured activity type associated with the group;
   for each of the at least one determined activity, inserting the graphical element associated with the determined activity into the selected dashboard template in one of the predefined locations within the group of predefined locations associated with the pre-configured activity type associated with the badge to obtain a completed dashboard; and
   outputting the completed dashboard.

9. The method of claim 8, wherein said receiving the at least one activity comprises receiving a form completed by the user and comprising data about each of the at least one activity, and extracting each of the at least one activity from the form.

10. The method of claim 8, wherein said receiving the at least one activity comprises transmitting a request for information about the user to an external data source terminal and receiving the at least one activity therefrom.

11. The method of claim 10, further comprising transmitting the at least one activity to the user terminal for approval and receiving a confirmation of the at least one activity before performing said determining the activity type.

12. The method of claim 8, further comprising, for each of the at least one determined activity, inserting information about the determined activity's associated activity type in the dashboard template.

13. The method of claim 12, wherein the information about each of the at least one associated activity type comprises a name of the activity type.

14. A system for generating a dashboard containing key performance indicator information, the system comprising a processor, a communication unit and a memory, the processor being configured for:
   receiving at least one activity associated with a user;
   for each of the at least one received activity, determining an activity type, from a plurality of pre-configured activity types, which is associated with the received activity, wherein each of the at least one determined activity is associated with a different respective pre-configured activity type;

for each of the at least one determined activity, selecting a badge for the received activity from plurality of badges, wherein each of the at least one determined badge being associated with at least a respective one of the at least one determined activity, and each of the determined at least one badge is associated with the user;

for each of the at least one determined activity, retrieving a graphical element corresponding to the determined activity from a plurality of graphical elements, wherein each of the plurality of graphical elements is associated with a respective on of the plurality of badges, wherein each of the at least one retrieved graphical element is indicative of a completion of the graphical element's associated activity by the user;

selecting a dashboard template from a plurality of dashboard templates, wherein each dashboard template has a different aesthetic, each of the plurality of dashboard templates has a different aesthetic, each of the plurality of dashboard templates comprises more than one group of predefined locations, each of the groups of predefined locations are associated with a different respective pre-configured activity type, and each predefined location within a group is configured to receive only graphical elements associated with the pre-configured activity type associated with the group;

for each of the at least one determined activity, inserting the graphical element associated with the determined activity into the selected dashboard template in one of the predefined locations within the group of predefined locations associated with the pre-configured activity type associated with the badge to obtain a completed dashboard; and outputting the completed dashboard.

15. The system of claim 14, wherein the processor is further configured for receiving a form completed by the user and comprising data about each of the at least one activity, and extracting each of the at least one activity from the form.

16. The system of claim 14, wherein the processor is further configured for transmitting a request for information about the user to an external data source terminal and receiving the at least one activity therefrom.

17. The system of claim 15, wherein the processor is further configured for transmitting the at least one activity to the user terminal for approval and receiving a confirmation of the at least one activity before said determining the activity type.

18. The system of claim 14, wherein the processor is further configured to, for each of the at least one determined activity, inserting information about the determined activity's associated activity type in the dashboard template.

* * * * *